(12) United States Patent
Gerligand et al.

(10) Patent No.: US 8,668,331 B2
(45) Date of Patent: Mar. 11, 2014

(54) METHOD FOR DESIGNING NON-ROUND SOFT CONTACT LENSES

(75) Inventors: Pierre-Yves Gerligand, Jacksonville, FL (US); Philippe F. Jubin, Fernandina Beach, FL (US); Timothy A. Clutterbuck, Jacksonville, FL (US); Radhakrishnan Damodharan, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 153 days.

(21) Appl. No.: 13/245,923

(22) Filed: Sep. 27, 2011

(65) Prior Publication Data
US 2013/0077045 A1 Mar. 28, 2013

(51) Int. Cl.
*G02C 7/04* (2006.01)

(52) U.S. Cl.
CPC ..................................... *G02C 7/048* (2013.01)
USPC ................. 351/159.02; 351/159.73

(58) Field of Classification Search
USPC .............. 351/159.73–159.81, 159.02, 159.18
See application file for complete search history.

(56) References Cited

U.S. PATENT DOCUMENTS

| 6,511,179 B1 * | 1/2003 | Davis et al. ............. 351/159.74 |
| 7,216,978 B2 | 5/2007 | Perez et al. |
| 2011/0149230 A1 | 6/2011 | Menezes et al. |

FOREIGN PATENT DOCUMENTS

| EP | 0732608 A1 | 9/1996 |
| GB | 1463107 | 2/1977 |
| WO | WO 2005/116730 A1 | 12/2005 |
| WO | WO 2009/111545 A2 | 9/2009 |

OTHER PUBLICATIONS

International Search Report for corresponding Patent Application No. PCT/US2012/056530 mailed Jan. 2, 2013.

\* cited by examiner

*Primary Examiner* — Scott J Sugarman
*Assistant Examiner* — Robert E Tallman
(74) *Attorney, Agent, or Firm* — Carl J. Evens

(57) ABSTRACT

A method for optimizing the performance in centration, rotation and stability of contact lenses makes use of the upper and lower eyelid geometries to maximize the lens-lid interaction for two different contact lens positions on the eye. The contact lenses are non-round lenses for maximum interaction with the eyelids.

26 Claims, 11 Drawing Sheets

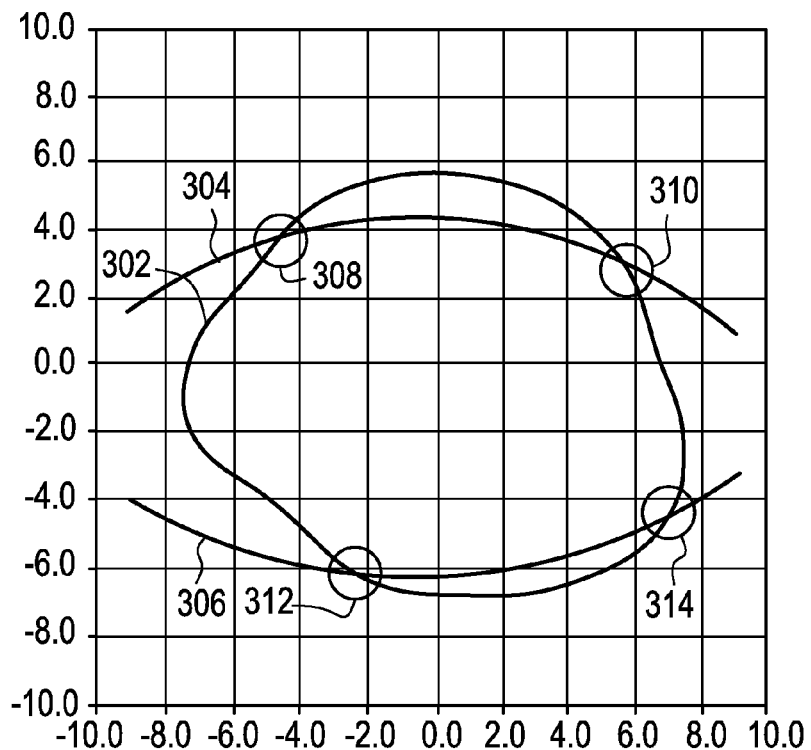
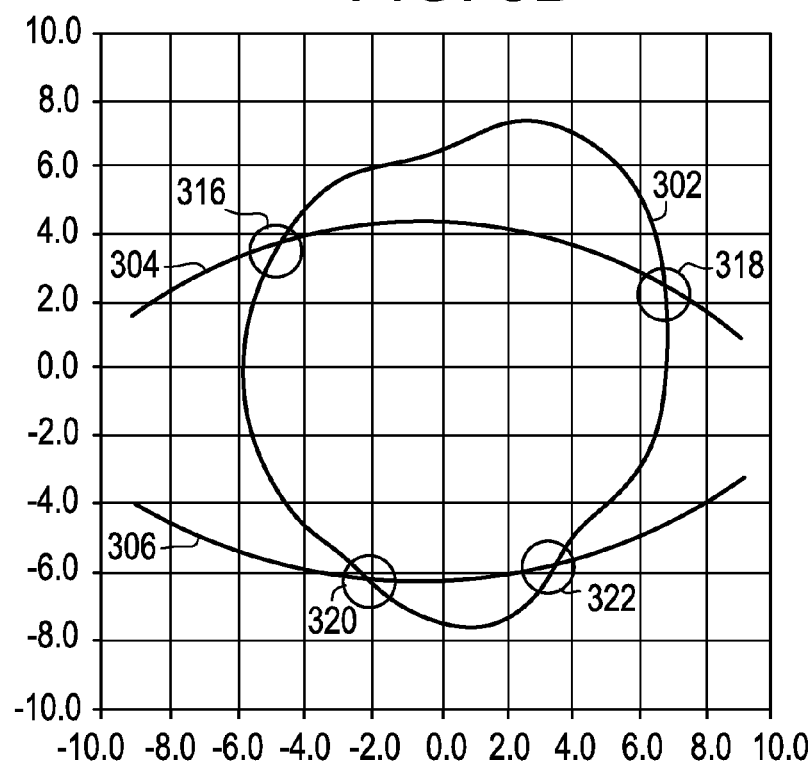

| Control point | Radius | Theta |
|---|---|---|
| 1 | 6.25 | 90 |
| 2 | 7.50 | 190 |
| 3 | 6.75 | 270 |
| 4 | 8.25 | 330 |

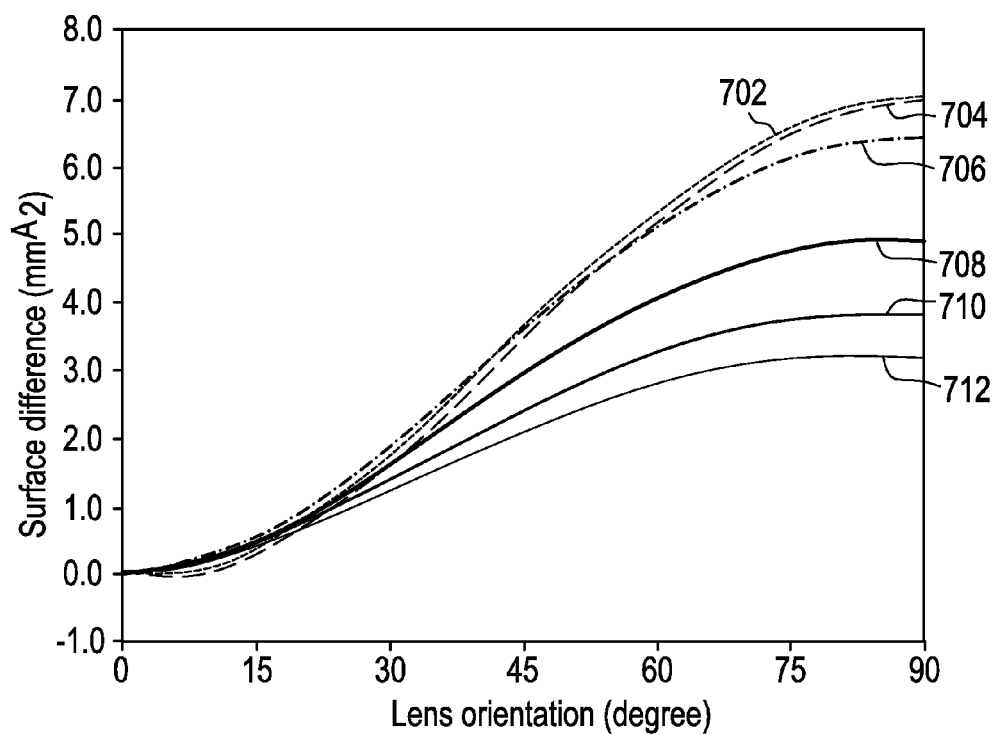

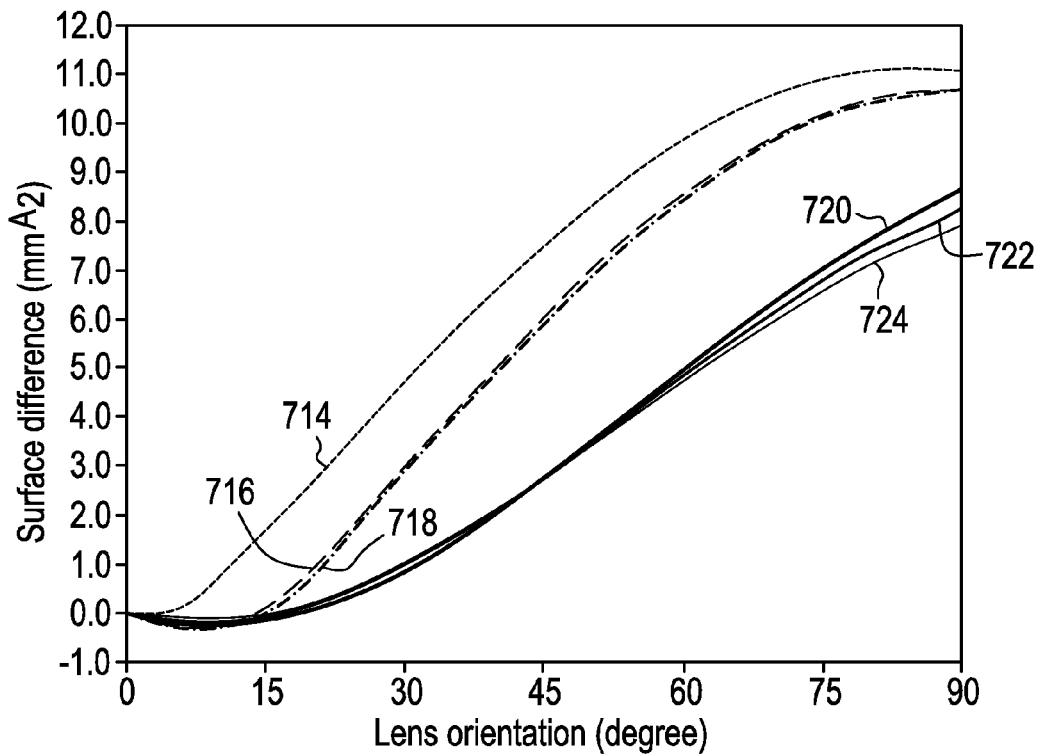

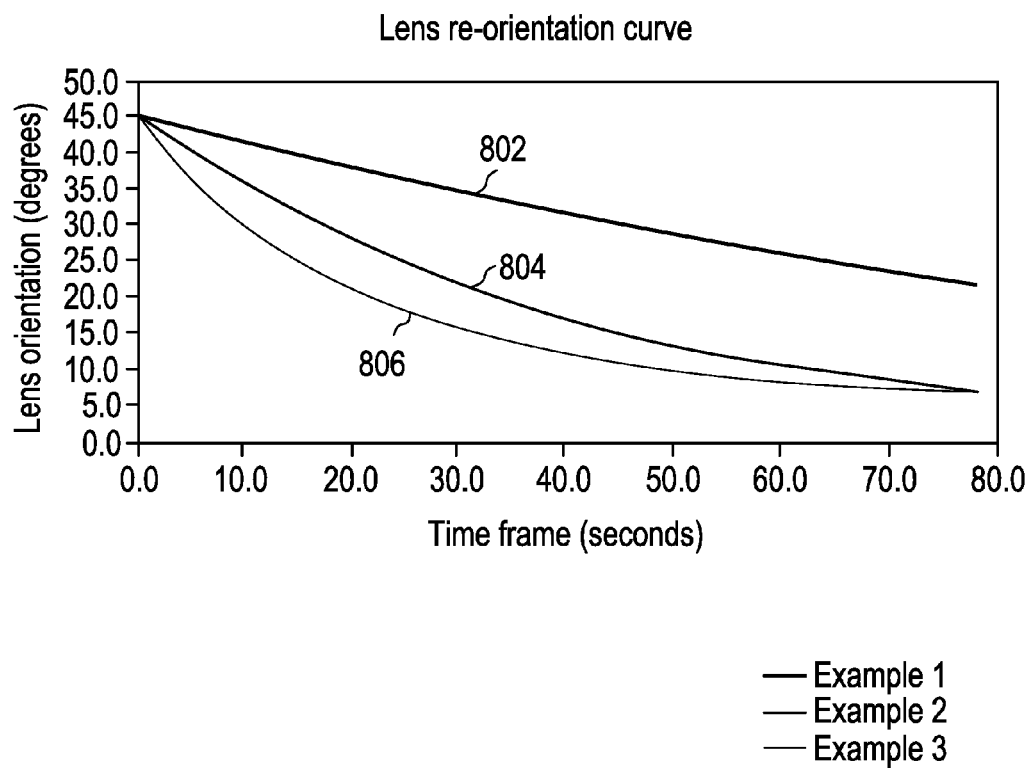

METHOD FOR DESIGNING NON-ROUND SOFT CONTACT LENSES

BACKGROUND OF THE INVENTION

1. Field of the Invention

The present invention relates to a method for designing non-round soft contact lenses, and more particularly to a method for designing non-round soft contact lenses with the objective of improving lens stability, rotation and centration on eye by optimizing the variation of lens-lid contact area as a function of the lens position in the centration/rotation on the wearer's eye.

2. Discussion of the Related Art

It is known that correction of certain optical defects may be accomplished by imparting non-rotationally symmetric corrective characteristics to one or more surfaces of a contact lens such as cylindrical, bifocal, multifocal, wavefront corrective characteristics or decentration of the optical zone. It is also known that certain cosmetic features such as print patterns, markings, and the like are required to be placed in a specific orientation relative to the wearer's eye. The use of contact lenses is problematic in that each contact lens of the pair must be maintained at a specific orientation while on the eye to be effective. When the contact lens is first placed on-eye, it must automatically position, or auto-position, itself and then maintain that position over time. However, once the contact lens is positioned, it tends to rotate on the eye due to the force exerted on the contact lens by the eyelids during blinking.

Maintenance of the on-eye orientation of a contact lens typically is accomplished by altering the mechanical characteristics of the contact lens. For example, prism stabilization, including decentering of the contact lens' front surface relative to the back surface, thickening of the inferior contact lens periphery, forming depressions or elevations on the contact lens' surface, and truncating the contact lens edge, are methods that have been used.

Additionally, dynamic stabilization has been used in which the contact lens is stabilized by the use of thick and thin zones, or areas in which the thickness of the contact lens' periphery is increased or reduced, as the case may be. Typically, the thick and thin zones are located in the contact lens' periphery with symmetry about the vertical and horizontal axes. For example, each of two thick zones may be positioned on either side of the optic zone and centered along the 0-180 degree axis of the contact lens. Thus, in the majority of individuals the upper eyelid, for example, will strike the uppermost end of one thick zone before it does the other. This results in tilting of the contact lens moving it away from the orientation that is sought to be maintained.

Maintenance of contact lens orientation and centration has been performed so far using mechanical features on the contact lenses but no design is currently taking advantage of the geometry of the upper and lower eyelids to adjust the shape of the contact lens outer contour in accordance with these geometries to provide improved stability in orientation, rotation and centration.

U.S. Pat. No. 7,216,978 illustrates that the upper and lower eyelids do not move strictly in a vertical direction, with an up and down stroke during blinking. The upper eyelid moves substantially vertically, with a small nasal component during blinking, and the lower eyelid moves substantially horizontally, moving nasalward during blinking. Additionally, the upper and lower eyelids are not symmetrical with respect to a plane cutting though the vertical meridian. In other words, individuals do not blink symmetrically relative to a horizontal axis drawn between the open upper and lower lid. Also, it is known that the eyes converge when the viewer gazes down to read. Accordingly, blinking in of itself may not result in the ideal translation of the contact lens.

Accordingly, it would be advantageous to develop a method for designing contact lenses that optimizes the shape of the contact lens outer contour such that the difference between the lens-eyelid contact area when the contact lens is mis-oriented and the lens-eyelid contact area when the contact lens is correctly oriented is maximized.

SUMMARY OF THE INVENTION

The method for designing non-round soft contact lenses of the present invention overcomes a number of the disadvantages associated with orienting contact lenses on a wearer's eye.

The present invention is directed to a new method for designing non-round soft contact lenses with the objective of improving lens stability, rotation and centration on eye. The method optimizes the variation of lens-lid contact area as a function of the contact lens position in centration/rotation on the wearer's eye. The lens-lid contact area is defined as the contact lens surface area overlapped by the upper and lower eyelids. This method optimizes the shape of the contact lens outer contour such that the difference between the lens-lid contact area when the lens is mis-oriented and the lens-lid contact area when the contact lens is correctly oriented is maximized.

The method comprises initially setting the geometry of the upper and lower eyelids. Those geometries may be either a population average representing an ethnicity such as Caucasian, Asian, African, or those geometries may be custom based. Once the eyelid geometry is set, the next step is setting the ocular geometry comprising the cornea shape, limbal shape and sclera shape. The next step involves setting the contact lens geometry (front and back optic zones, front and back periphery, edge geometry, center thickness, material, and the like). Once all the geometries are set, the next step involves estimating the contact lens centration on eye if necessary using finite element analysis to wrap that contact lens on the previously described ocular shape. The contact lens centration corresponds to the location of minimum strain energy. The next step involves selecting the two extreme contact lens orientations, one of these orientations being the contact lens final position/orientation on eye. The final step comprises optimizing the contact lens shape to maximize the lens-lid contact area difference between these two extreme contact lens orientations.

The method for designing non-round soft contact lenses provides a contact lens with improved lens stability, rotation and centration on eye. These contact lenses also provide a clear and comfortable fit with enhanced visual acuity due to proper positioning.

BRIEF DESCRIPTION OF THE DRAWINGS

The foregoing and other features and advantages of the invention will be apparent from the following, more particular description of preferred embodiments of the invention, as illustrated in the accompanying drawings.

FIGS. 3A and 3B are diagrammatic representations of a non-round contact in two different positions on an eye and the corresponding lens-lid intersection according to the present invention.

FIGS. 7A and 7B are graphical illustrations of lens-lid contact area surface difference versus contact lens orientation for an elliptical contact lens and a non-round contact lens, respectively, in accordance with the present invention.

FIG. 8 is a graphical representation of contact lens re-orientation responses for round, elliptical and non-round contact lenses in accordance with the present invention.

DETAILED DESCRIPTION OF THE PREFERRED EMBODIMENTS

Figure 1:
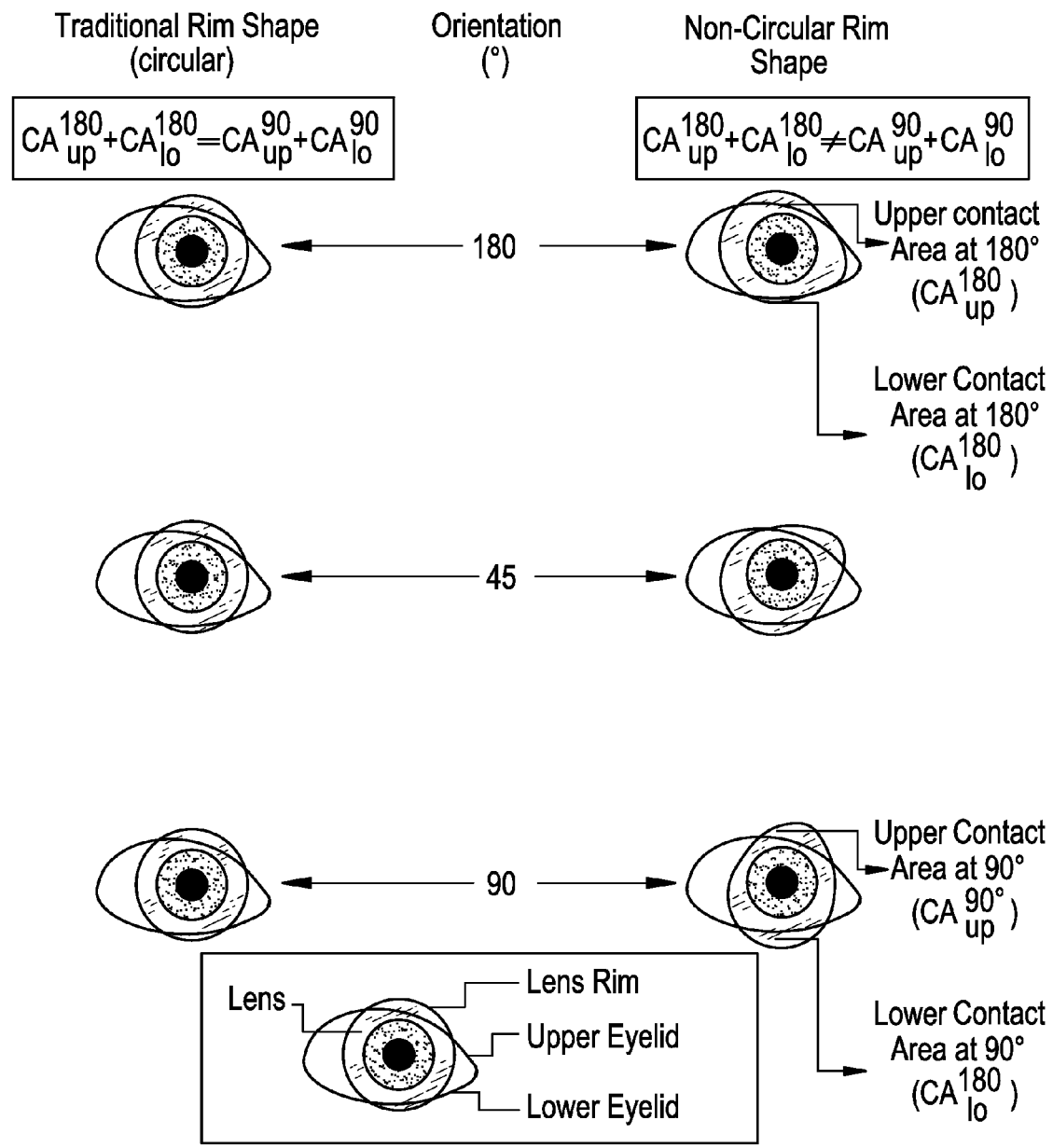
FIG. 1 illustrates the difference in lens-eyelid contact area between a traditional circular contact lens and a non-round contact lens in accordance with the present invention.

The present invention is directed to a new method for designing non-round soft contact lenses with the objective of improving lens stability, rotation and centration on eye. The method optimizes the variation of lens-lid contact area as a function of the contact lens position in centration/rotation on the wearer's eye. The lens-lid contact area is defined as the contact lens surface area overlapped by the upper and lower eyelids. This method optimizes the shape of the contact lens outer contour such that the difference between the lens-lid contact area when the lens is mis-oriented and the lens-lid contact area when the contact lens is correctly oriented is maximized.

For purposes of the present invention a contact lens is defined by at least three distinct regions. The inner region from which the vision correction is obtained, the outer periphery of the contact lens that provides mechanical stability of the contact lens on eye, and an intermediate region located between the inner region and the outer region used for blending the two aforementioned regions in a smooth manner such that discontinuities do not occur.

The inner region or optical zone provides vision correction and is designed for a specific need such as single vision correction, astigmatism vision correction, bi-focal vision correction, multi-focal vision correction, custom correction or any other design that may provide vision correction. The outer periphery or peripheral zone provides stabilization of the contact lens on the eye including, centration and orientation. Orientation stabilization is fundamental when the optical zone includes non-rotationally symmetric features, such as astigmatic correction and/or high order aberrations correction. The intermediate region or zone ensures that the optical zone and the peripheral zone are blended with tangent curves. It is important to note that both the optical zone and the peripheral zone may be designed independently, though sometimes their designs are strongly related when particular requirements are necessary. For example, the design of a toric lens with an astigmatic optical zone might require a particular peripheral zone for maintaining the contact lens at a predetermined orientation on the eye.

For purposes of the present invention a contact lens is also defined by a front surface or surface power, a back surface or base curve and an edge. The front and back surface of the contact lens is described by at least three regions, the inner region from which the vision correction is obtained, the outer region or periphery of the contact lens that provides mechanical stability of the contact lens on eye, and an intermediate region located between the inner region and the outer region used for blending the two aforementioned regions in a smooth manner such that discontinuities do not occur.

It is well known that current toric lens designs use the top and bottom eyelid pressure in order to re-orient the contact lens on eye. A toric lens is a lens having two different powers in two orientations that are perpendicular to one another and are typically utilized to correct for astigmatism. Another way to control the forces applied to the contact lenses by the eyelids is to control the surface contact area between the lens and the eyelids. For a constant eyelid pressure, increasing (decreasing) the lens-lid contact area will increase (decrease) the forces applied by the eyelids to the contact lens. Hence, for a given palpebral aperture and eyelids shape, the shape of the contact lens may be tailored such that the lens-lid contact area is maximized when the lens is mis-oriented, and minimized when the lens is correctly oriented. It is the purpose of the present invention to provide a method to design a contact lens that controls the lens-lid contact area as a function of the contact lens orientation on the eye.

Most of the eyelid pressure is distributed along the lid wiper, a pressure band about 0.40 mm to 0.60 mm wide along the edge of the upper and lower eyelids. It is also known that the palpebral conjunctiva (the conjunctiva that lines the eyelids) does not contact directly the bulbar conjunctiva (conjunctiva that lines the whites of the eyes). A gap filled with a thin tear film exists between these two tissues. Although most of the pressure is exerted by the lid wiper one may assume that the palpebral conjunctiva also contributes to a certain amount of pressure through the tear film.

As illustrated in FIG. 1 the lens-lid contact area is independent of the contact lens orientation for traditional circular lenses. Maximizing this lens-lid contact area as a function of the contact lens orientation may only be obtained using a non-round shape as also illustrated in FIG. 1. The optimization of this non-round shape may only be obtained by considering the upper and lower eyelid geometries as these geometries define one of the boundaries of these upper and lower contact areas. As illustrated, for the traditional circular shape contact lens, the contact area of the upper lid at 180 degrees and the contact area of the lower lid at 180 degrees is equal to the contact area of the upper lid at 90 degrees and the contact area of the lower lid at 90 degrees, which is not true for the non-circular rim shape contact lens.

The method of the present invention comprises optimizing the lens-lid contact area difference between two or more different lens positions on the eye. Those positions correspond to the desired final position of the lens on the eye, and at least another less desirable lens position occurring during the wear period.

In one exemplary embodiment in accordance with the method of the present invention, the upper or superior lens lid-contact area difference is calculated using only the surface area defined by the contour of the upper eyelid and the edge of the contact lens of the portion of the contact lens overlapped by the upper eyelid. In another exemplary embodiment in accordance with the method of the present invention, the lower or inferior lens-lid contact area overlapped by the lower eyelid is also taken into consideration either by itself or combined with the contribution of the superior lens-lid contact area.

In yet another exemplary embodiment in accordance with the method of the present invention the superior lens-lid pressure band area difference is calculated using only the surface area defined by the pressure band of the upper eyelid and the edge of the contact lens of the portion of the contact lens overlapped by the upper eyelid. In still another exemplary embodiment of the method in accordance with the present invention the inferior lens-lid pressure band area overlapped by the lower eyelid is also taken into consideration either by itself or combined with the contribution of the superior lens-lid pressure band.

Surface area calculation may be performed using any suitable mathematical tools provided that the boundaries of the surface to be calculated are known. In the present invention, the surface area is defined between the upper/lower eyelid contour and the upper/lower contact lens edge overlapped by the eyelids in the X-Y coordinate plane defined as the plane perpendicular to the eye optical axis. In another exemplary embodiment of the present invention, the surface area calculation may be carried out using true topographical surface area using the same boundaries previously described. This second method takes into account any feature added to the front surface of the contact lens that might increase or decrease that surface area of the contact lens such as stabilization zones or any other features that provides mechanical stabilization of the contact lens on eye.

Figure 2:
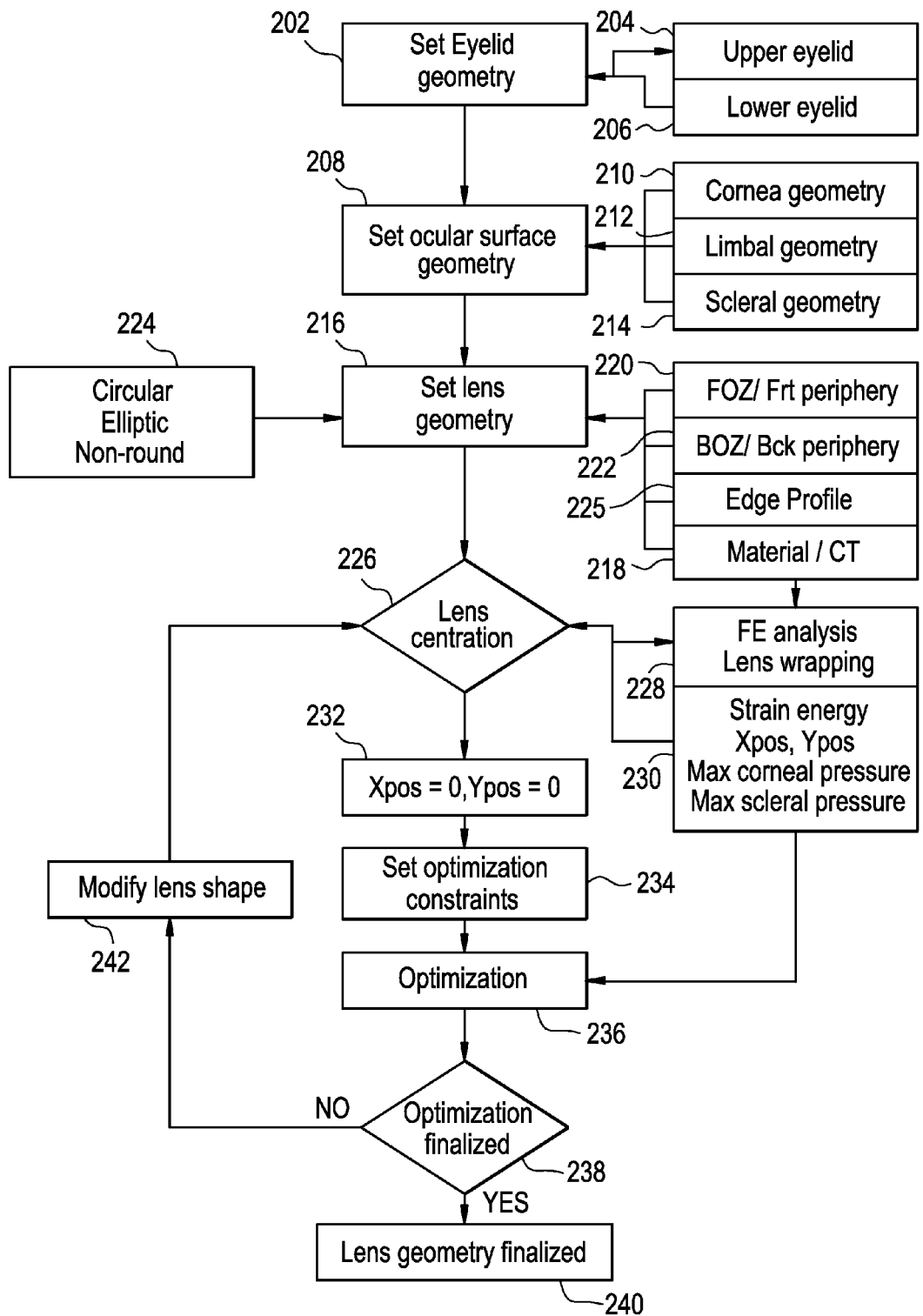
FIG. 2 is a flow chart of the method for designing non-round soft contact lenses in accordance with the present invention.

An exemplary method in accordance with the present invention may be broadly set forth as follows. In a first step, the geometries of either and/or both of the upper and lower eyelids is specified or described. These geometries may be mathematically described by a second order or higher polynomial; however, other mathematical tools may be utilized. In a second step, the geometry of the ocular surface comprising the cornea (transparent front part of the eye that covers the iris, the pupil and the anterior chamber), the sclera (white of the eye) and the limbal region (junction where sclera stops and cornea begins) connecting the sclera to the cornea is specified or described. In a third step, the initial geometry for the contact lens to be later optimized is selected or described. The contact lens geometry includes center thickness, front and back surface geometry, edge contour and material properties. In a fourth step, the initial contact lens centration based upon the specified eyelid geometry and the specified geometry of the ocular surface is estimated. In a fifth step, the different constraints required for optimization are set. In a final step, the lens edge contour to maximize the lens-lid contact area difference for two or more different contact lens positions on the eye is optimized based on the constraints set in the fifth step. FIG. 2 is a flow chart representation of an exemplary method in accordance with the present invention and is described in detail below.

In a first step of the exemplary method in accordance with the present invention, represented by elements 202, 204 and 206 in the flow chart, the geometries of one and/or both of the upper and lower eyelids is/are specified. These geometries may be either a population average representing an ethnicity such as Caucasian, Asian or African for example, or these geometries may be associated with a unique patient right and/or left eye. These geometries may be mathematically described by a second order or higher order polynomial as these geometries are relatively simple. However, other mathematical tools may be used to describe these geometries. One of the advantages of using a polynomial is the direct calculation of the surface area between the upper/lower eyelid and the horizontal X-axis, for example, as the eyelid contour is described by a continuous curve. The integration method thus does not require the use of any numerical method to determine that surface area. The area is directly obtained from the integration of that polynomial.

For a given ethnicity, there is a predictable or average eyelid geometry that may be represented mathematically by a polynomial as described above. A custom eyelid geometry may be determined by taking a digital image of the eyes of a subject and then determining a polynomial fit to develop a polynomial expression that best represents the eyelid geometry.

In a second step of the exemplary method in accordance with the present invention, represented by elements 208, 210, 212 and 214 in the flow chart, the geometry of the ocular surface comprising the cornea, the sclera and the limbal region connecting the sclera to the cornea is specified. In a preferred exemplary embodiment, the cornea may be described by an aspheric surface described by equation 1 given by $$Z = CS^2/(1+(1-(1+k)C^2S^2)^{1/2}), \qquad (1)$$

wherein Z is the sagittal depth of the surface, C is the curvature of the cornea (C=1/R, where R is the radius of curvature), k is the conic constant, and S is the radial position. The cornea is best described if the R and k values of the aspheric surface are defined from clinical topography data. For example, a good set of data that describes the cornea for a Caucasian eye, but is not limited to, R=7.85 mm and k=−0.26. This aspheric surface may also be replaced by a toric aspheric or biconic surface if a cornea containing astigmatism is to be described. A toric aspheric or biconic surface may be described by equation 2 given by $$Z = (C_x X^2 + C_y Y^2)/(1+(1-(1+k_x)C_x^2 X^2-(1+k_y)C_y^2 Y^2)^{1/2}), \qquad (2)$$

wherein Z is the sagittal depth of the surface at the coordinates location (X, Y), $C_x = 1/R_x$, where $R_x$ is the radius of curvature along the X axis, $C_y = 1/R_y$, where $R_y$ is the radius of curvature along the Y axis, $k_x$ and $k_y$ are the conic constants along the X axis and the Y axis respectively. The $S^2$ term of equation (1) is represented or substituted in equation (2) as $X^2 + Y^2$. In other words $S^2 = X^2 + Y^2$, where S is the radial position as defined above.

The sclera may be described by a spherical surface of radius $R_S$. This spherical surface is best described if $R_S$ is defined from clinical topography data. In a preferred exemplary embodiment, the sclera may be described by a more complex surface such as an aspheric surface. It is well known by the skilled artisan that the curvature of the sclera does not differ too much along the superior and inferior region of the eye, but that the curvature of the temporal region is steeper than the nasal region. The limbal region may be described by a fillet of radius $R_L$ connecting the two adjacent regions such that the transition between these regions is smooth and continuous. The advantage of using a third curve for the limbal area is the ability to model different transition profiles from cornea to sclera.

In a third step of the exemplary method in accordance with the present invention, represented by elements 216, 218, 220, 222 and 224 in the flow chart, an initial geometry for the contact lens to be later optimized is specified. The contact lens geometry selection includes selecting the center thickness, which is based upon the lens material and the type of lens described, element 218, the front and back surface geometry within the optic zone and the periphery, the lens edge profile, element 225, and the initial lens shape of the outer contour, element 224. The contact lens shape of the outer contour may simply be a circular shape that is commonly used for contact lenses, or a more complex shape such as an elliptical shape or even more complex shape such that the initial lens edge contour is non-round. It is also important to select the material from which the contact lens is fabricated as this is a crucial parameter for the next step of the process. Material properties as well as contact lens geometry will dictate the strain energy contained in that contact lens after it has wrapped on the geometry of the eye.

In a fourth step of the exemplary method in accordance with the present invention, represented by elements 226, 228, 230 and 232 in the flow chart, the initial lens centration is estimated, if it is required, using a finite element methodology, element 228, or any other suitable estimation methodology. Once the finite element analysis of the lens wrapping is complete, the maximum corneal pressure and the maximum sclera pressure are obtained, element 230. The contact lens centration corresponds to the position of minimum strain energy. Depending on the complexity of the initial geometry of the contact lens, it may be preferable to carry out the estimation of the contact lens centration for different contact lens orientations on the eye. In a preferred exemplary embodiment of the method, the contact lens centration is carried out for each of the selected positions the lens-lid contact area will be determined.

In a fifth step of the exemplary method in accordance with the present invention, represented by element 234 in the flow chart, the optimization constraints are defined. These constraints include the range of the horizontal diameter of the contact lens along the horizontal axis, the range of the vertical diameter of the contact lens along the vertical axis, the maximum horizontal contact lens semi-diameter difference, the maximum vertical contact lens semi-diameter difference, the minimum and maximum lens-lid overlaps at the upper and lower eyelids and the contact lens centration. Any number of additional constraints may be added to the above. Alternately, any suitable collection of design constraints may be utilized.

In a sixth step of the exemplary method in accordance with the present invention, represented by elements 236, 238, 240 and 242 of the flow chart, the optimization of the contact lens shape is carried out until a solution is reached. The optimization is set to maximize the lens-lid contact area either in the upper region of the contact lens, or in the lower region of the contact lens, or in both regions of the contact lens, for at least two different positions of the contact lens on the eye. In a preferred exemplary embodiment of the method, these positions correspond to the desired final position of the contact lens on eye and at least one other less or least desirable lens position occurring during the wear period. The less or least desirable position is when the rotational position of the contact lens is furthest away from its intended final position, typically ninety (90) degrees away from the desired final position.

The object or purpose of the present invention is to determine or estimate the upper lens-lid contact area, or the lower lens-lid contact area, or both the upper and lower lens-lid contact areas to best determine the contact lens edge contour that maximizes the contact area difference for at least two different contact lens orientations. The following exemplary procedure may be utilized to maximize this contact area difference.

FIGS. 3A and 3B illustrate examples of lens-lid orientation for two different positions of the same arbitrary non-round contact lens. In FIG. 3A, the non-round contact lens 302 is in its final resting orientation on the eye between the upper eyelid 304 and the lower eyelid 306. In FIG. 3B, the non-round contact lens 302 is off by ninety (90) degrees in a counter clockwise direction from its final orientation on the eye between the upper eyelid 304 and the lower eyelid 306. For purposes of describing the methodology, this ninety (90) degree misorientation is assumed to be the worst or least stable position that the non-round contact lens might assume of the eye. The intersection points between the upper eyelids 304 and the lower eyelids 306 are represented by circles 308, 310, 312, 314, 316, 318, 320 and 322. These points will specify the limits to be utilized to determine the upper and lower lens-lid contact areas.

The contact area may be calculated as follows. First, the intersection points 308, 310, 312 and 314 of the upper and lower regions are mathematically determined for the first contact lens orientation. Next, the surface area comprising the region between the upper eyelid 304 and the horizontal axis and limited by the projection of the intersection points 308 and 310 over the horizontal axis is calculated. This surface area may be calculated simply by integration with the intersection points 308 and 310 as the limits or integration boundaries. Next, the surface area comprising the region between the upper contact lens 302 edge and the horizontal axis and limited by the projection of the intersection points 308 and 310 over the horizontal axis is calculated. Once again, the surface area may be calculated via integration with the intersection points 308 and 310 as the boundaries or utilizing any other suitable method. Next, the difference between these two surface areas is calculated. All of these steps may be repeated for the lower eyelid 306 using intersection points 312 and 314 to determine the surface area difference in the inferior region of the contact lens. Once this is completed, the entire process is then repeated for a different contact lens position, such as illustrated in FIG. 3B, such that the lens-lid contact area difference can be determined.

For the skilled artisan, any number of mathematical tools may be utilized to define a non-round contour defining the edge of the contact lens. In one exemplary embodiment, the contact lens edge contour may simply be represented by a series of control points where each control point $P_n(R_n, \theta_n)$ is defined in the polar coordinate system by a radial distance $R_n$ and an angle $\theta_n$. If $(R_n, \theta_n)$ and $(R_{n+1}, \theta_{n+1})$ are two consecutive control points describing a section of the edge of the contact lens in a polar coordinate system, then the radial distance R from the lens center to the edge within this section is defined by equation 3 in which $$R = R_n + (R_{n+1} - R_n)\sin(90((\theta - \theta_n)/\theta_{n+1} - \theta_n)) \quad (3)$$

where $\theta_n < \theta \le \theta_{n+1}$.

Figure 4:
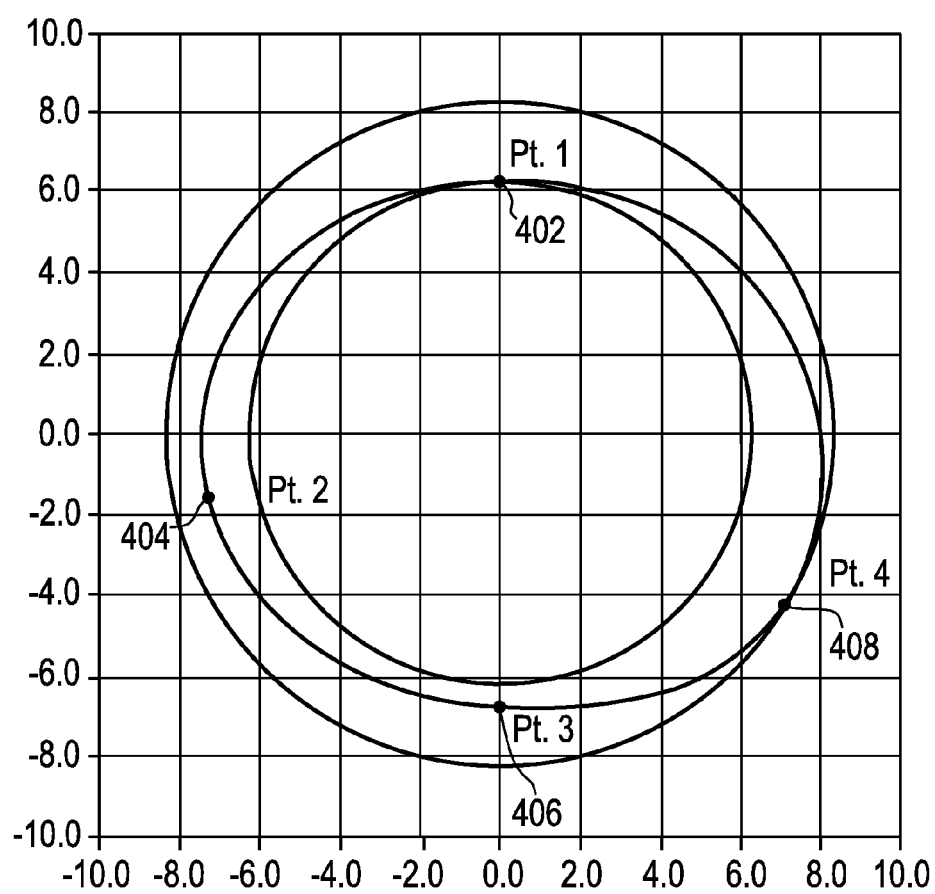
FIG. 4 is a diagrammatic representation of a first non-round contour contact lens obtained from the use of four control points in polar coordinates in accordance with the present invention.

A minimum of two control points are required to determine a contour, but preferably at least four control points are utilized such that each quadrant may contain at least one control point. For more complex contact lens edge contours, there is no limit to how many points may be utilized. Referring now to FIG. 4, there is illustrated a contact lens edge contour defined by four control points 402, 404, 406 and 408 which have a respective radius and angle.

While the above description sets forth exemplary embodiments of the inventive concepts, the examples given below will enable one to better understand specific embodiments and the advantages associated therewith. The set up and parameters for the examples given below will be provided first with a discussion of the results following.

The performance in rotation and centration for the contact lenses in the following three examples was obtained utilizing a simulation model as set forth in U.S. patent application Ser. No. 12/641,089 filed Dec. 17, 2009 which is incorporated by reference herein. In this simulation model, the contact lenses are free to move and rotate on the eye so that the centration and rotation behavior thereof may be determined. In this simulation model, it is assumed that tear films (aqueous layers) exist between the contact lens and the eye (cornea and sclera), between the contact lens and the eyelids, and that the eyelids exert a pressure on the contact lens. When the eyelids move, for instance during a blink, shearing in the tear film occurs and therefore shear stresses act upon the contact lens. The influence of the thickness distribution of the contact lens on the interaction between the contact lens and the eyelids (eyelid pressure) is taken into account. When fitted on the eye, the contact lens deforms and assumes the same shape as that of the eye. The position dependent deformation of the contact lens influences the elastic energy content of the contact lens and therefore has an effect on the position.

EXAMPLE 1

Figure 5A:
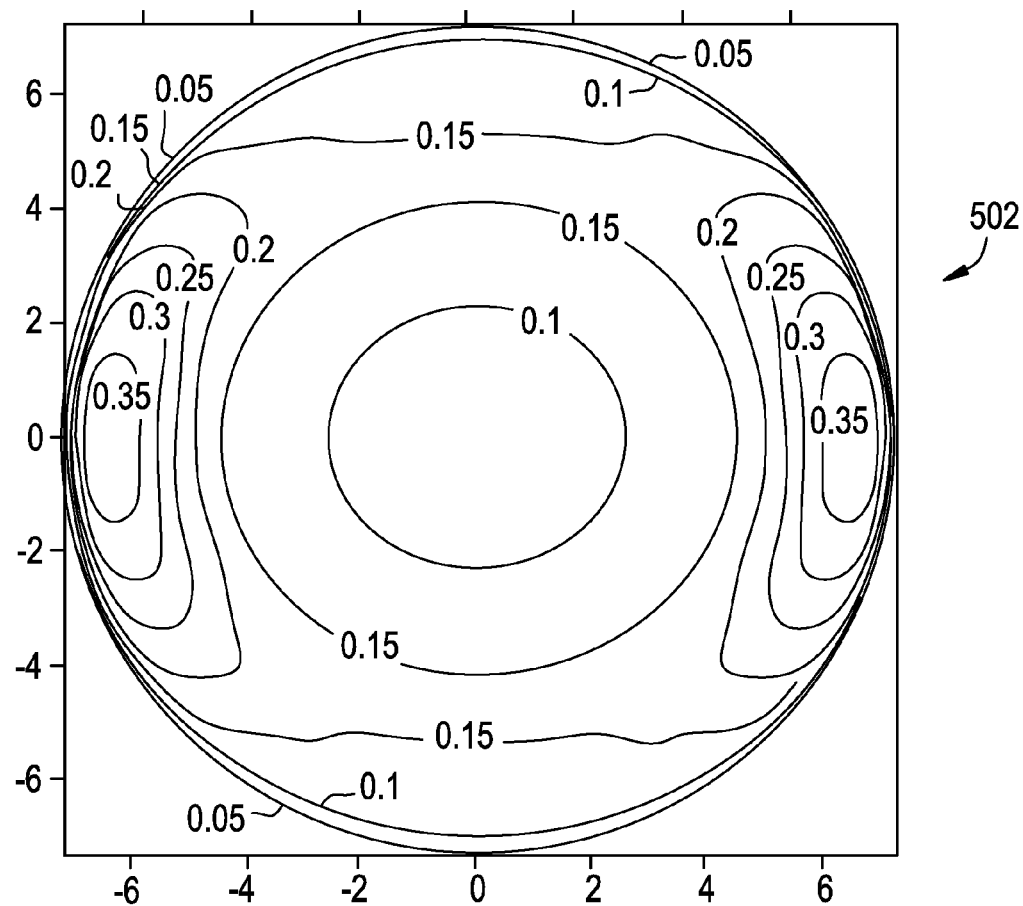
FIGS. 5A, 5B and 5C are normal thickness contour plots of round, elliptical, and non-round contact lenses.

A prior art contact lens 502 for astigmatic patients having a circular shape is illustrated in FIG. 5A and was designed utilizing conventional contact lens design software with the following input design parameters:
  Sphere Power: −3.00 D
  Cylinder Power: −0.75 D
  Cylinder Axis: 180 deg
  Lens Diameter: 14.50 mm
  Front Optical Zone Diameter: 8.50 mm
  Back Optical Zone Diameter: 11.35 mm
  Lens Base Curve: 8.55 mm
  Maximum Thickness Differential Within The Stabilization Zone: 0.270 mm.

The stabilization zone is an extra thick zone added to the thickness profile of that contact lens. This contact lens 502 is a typical example of a substantially circular toric lens. As the contact lens edge geometry is circular, the lens-lid contact area difference remains at zero independently of the orientation of the contact lens 502 on the eye. This design is presented as it is a good representation of what may be found among the commercially available contact lenses for correcting astigmatism. FIG. 5A illustrates a contour plot of the normal thickness of contact lens 502.

EXAMPLE 2

Figure 5B:
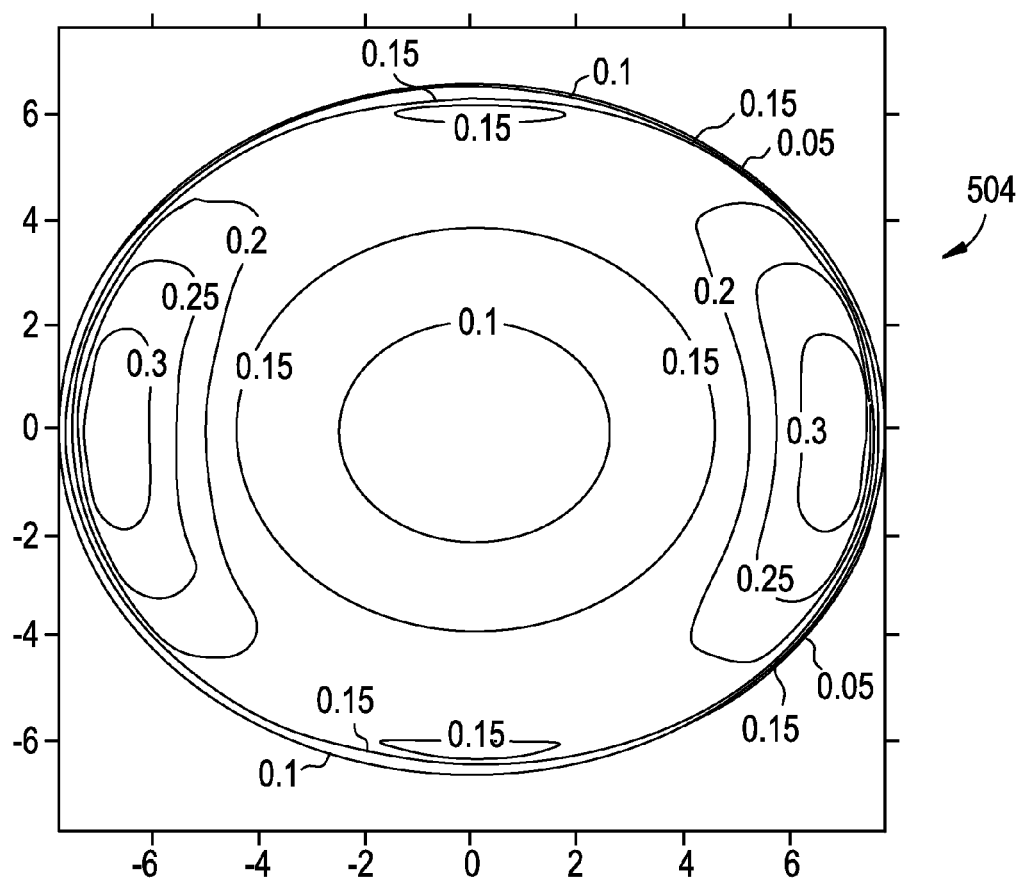

A contact lens 504 for astimatic patients having an elliptical shape is illustrated in FIG. 5B and was designed utilizing conventional contact lens design software with the following input design parameters:
  Sphere Power: −3.00 D
  Cylinder Power: −0.75 D
  Cylinder Axis: 180 deg
  Lens Horizontal Diameter: 15.50 mm
  Lens Vertical Diameter: 13.50 mm
  Front Optical Zone Diameter: 8.50 mm
  Back Optical Zone Diameter: 11.35 mm
  Lens Base Curve: 8.55 mm
  Maximum Thickness Differential Within The Stabilization Zone: 0.180 mm.

The stabilization zone of contact lens 504 has the same profile as the stabilization zone of contact lens 502 (Example 1); however, the magnitude has been reduced to sixty-six (66) percent of the maximum thickness differential of the contact lens 502. The location of maximum thickness of the stabilization zone follows the edge contour of the contact lens 504. FIG. 5B illustrates a contour plot of the normal thickness of contact lens 504.

EXAMPLE 3

Figure 5C:
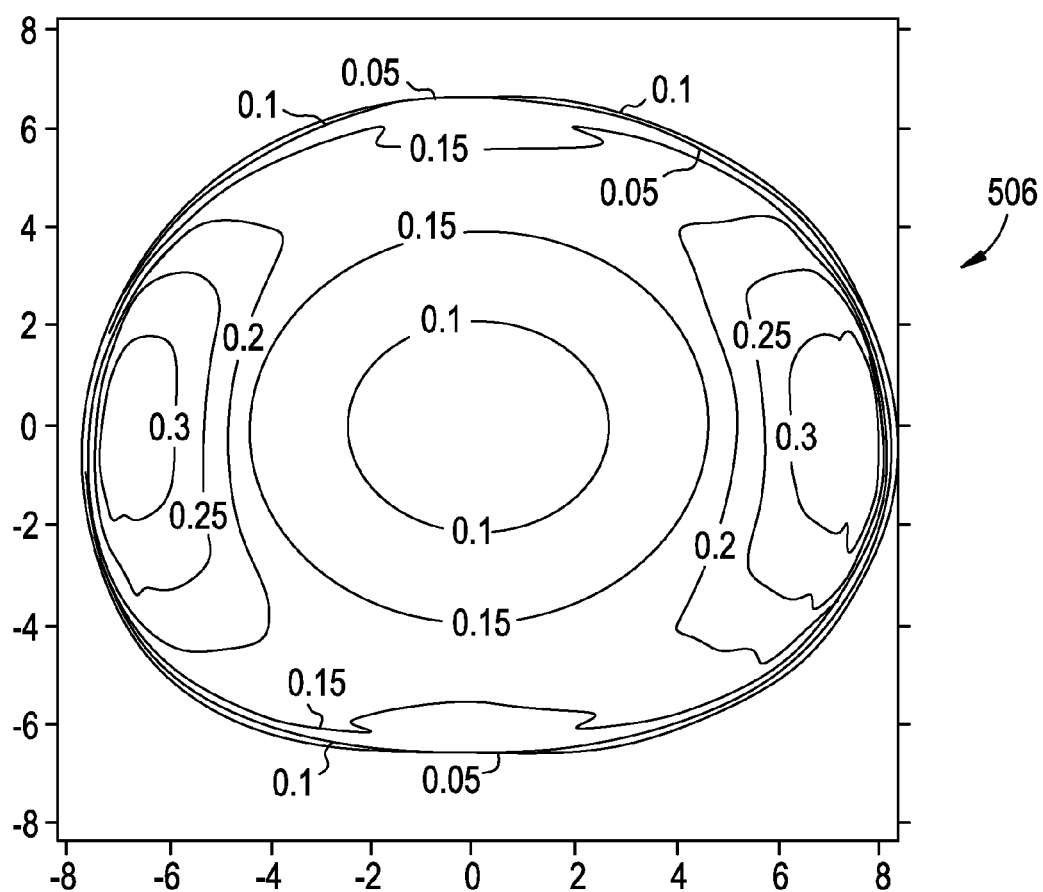

A contact lens 506 for astigmatic patients having a non-round shape is illustrated in FIG. 5C and was obtained, as described below, and designed utilizing conventional lens design software with the following input parameters:
  Sphere Power: −3.00 D
  Cylinder Power: −0.75 D
  Cylinder Axis: 180 deg
  Lens Diameter: 14.50 mm
  Front Optical Zone Diameter: 8.50 mm
  Back Optical Zone Diameter: 11.35 mm
  Lens Base Curve: 8.55 mm
  Maximum Thickness Differential Within The Stabilization Zone: 0.180 mm.

Figure 6:
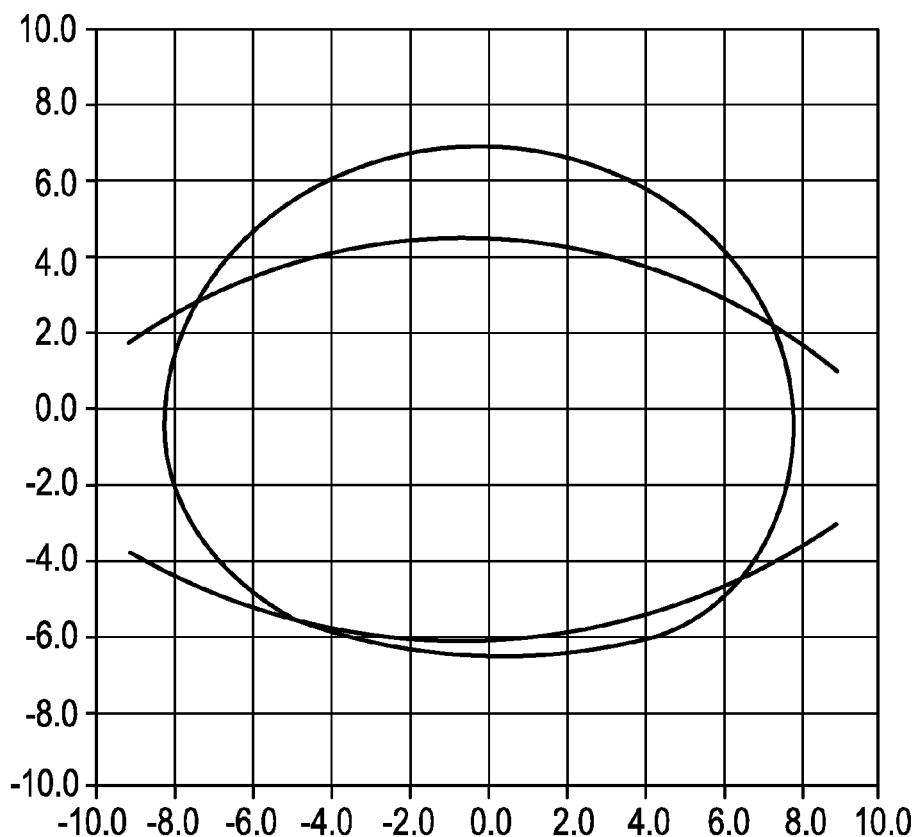
FIG. 6 is a diagrammatic representation of a second non-round contour contact lens obtained from the use of four control points in polar coordinates in accordance with the present invention.

The non-round edge contour of contact lens 506 is defined by the method set forth above utilizing four control points. The coordinates of those control points are given in FIG. 6. The stabilization zone of contact lens 506 also has the same profile as the stabilization zone of round contact lens 502 (Example 1), and once again the magnitude has been reduced to sixty-six (66) percent of the maximum thickness differential of the round contact lens 502. The location of maximum thickness of the stabilization zone follows the edge contour of the contact lens 506. FIG. 5C illustrates a contour plot of the normal thickness of contact lens 506.

Utilizing the methodology of the present invention, the lens-lid contact area difference was created for the contact lenses 504 and 506 of Example 2 (elliptical shape) and Example 3 (non-round shape). The final position or resting position of each contact lens was taken as the reference position for estimating the contact area differences. No contact area difference was estimated for the round contact lens 502 of Example 1 (circular shape) as its contour remains symmetrical independently of its position on the eye. Contact lens centration was not taken into account for this calculation. While centration is an important parameter of the process, it adds a significant complexity to the process and thus detracts from the teaching of the examples which are utilized to illustrate and simplify the process. Although the upper lens-lid contact area contributes the most to lens rotation as only the upper eyelid has a vertical motion during a blink, both upper and lower contact area differences are provided in FIGS. 7A and 7B.

FIG. 7A graphically illustrates both the upper and lower lens-lid contact area difference versus contact lens orientation for the contact lens 504 of Example 2, and FIG. 7B graphically illustrates both the upper and lower lens-lid contact area difference versus contact lens orientation for the contact lens 506 of Example. 3. As opposed to specific lid geometries, for example, eyelid geometries measured for a specific person, eyelid geometries were obtained from clinical studies specifically preformed for gathering information regarding the eye and eyelid biometric data of population groups or population subgroups. In the examples set forth herein, eyelid geometries for these sample populations were utilized. Each population subgroup comprised about one hundred (100) individuals. Table 1 below summarizes the eyelid geometries for the three population subgroups. Essentially, this data represents averages for the specific population studied. The numbers in the table are coefficients of the polynomials representing the geometries with A2 representing the $X^2$ term, A1 representing the X term and A0 the constant term.

TABLE 1

Upper and lower eyelid geometries for different population.

| | Upper eyelid | | | Lower eyelid | | |
|---|---|---|---|---|---|---|
| | A0 | A1 | A2 | A0 | A1 | A2 |
| Group 1 | | | | | | |
| Mean | 4.394 | −0.040 | −0.038 | −6.24 | 0.043 | 0.033 |
| StdDev. | 1.015 | 0.087 | 0.006 | 0.929 | 0.071 | 0.006 |
| Group 2 | | | | | | |
| Mean | 3.614 | −0.117 | −0.039 | −6.165 | 0.036 | 0.032 |
| StdDev. | 1.01 | 0.139 | 0.007 | 0.785 | 0.064 | 0.006 |
| Group 3 | | | | | | |
| Mean | 3.807 | −0.088 | −0.037 | −6.538 | −0.012 | 0.031 |
| StdDev. | 1.035 | 0.080 | 0.006 | 0.874 | 0.068 | 0.006 |

In FIG. 7A, curves 702, 704 and 706 represent the surface area difference versus contact lens orientation for the lower eyelid for the Group 2 population eye, the Group 1 population eye and the Group 3 population eye respectively for the contact lens 504 of Example 2. Curves 708, 710 and 712 represent the surface area difference versus contact lens orientation for the upper eyelid for the Group 1 population eye, the Group 3 population eye, and the Group 2 population eye respectively for the contact lens 504 of Example 2. In FIG. 7B, curves 714, 716 and 718 represent the surface area difference versus contact lens orientation for the lower eyelid for the Group 3 population eye, the Group 2 population eye and the Group 1 population eye, respectively, for the contact lens 506 of Example 3. Curves 720, 722 and 724 represent the surface area differences versus contact lens orientation for the upper eyelid for the Group 1 population eye, the Group 3 population eye and the Group 2 population eye respectively for the contact lens of Example 3.

The lens-lid contact area difference was increased by about one hundred (100) percent in the upper region of the contact lens and by about sixty (60) percent in the lower region between the contact lens 504 of Example 2 and the contact lens 506 of Example 3 for the least stable position (contact lens orientation of ninety (90) degrees). The non-round contact lens 506 (Example 3) presents tighter contact area differences across the different positions and populations meaning that this design will fit all three populations. The elliptical contact lens 504 will be preferably used for the Group 1 population as it shows the largest contact area differences for this ethnicity. The non-round contact lens 506 also presents less variation on the lens-lid contact area difference for small contact lens mis-orientation around the resting position (contact lens orientation within fifteen (15) degrees of the resting position) meaning a better angular stability of the contact lens on the eye.

FIG. 8 graphically illustrates or summarizes the contact lens re-orientation obtained from the simulation model on a right eye. Curve 802 represents the contact lens results for Example 1, curve 804 represents the contact lens results for Example 2, and curve 806 represents the contact lens results for Example 3. Each contact lens was initially oriented forty-five (45) degrees away from the horizontal in the counter clockwise direction. The eye and eyelid geometries used were selected to best represent a Caucasian eye. The contact lens re-orientation was calculated over a set of twenty-four (24) blink cycles representing a time frame of about seventy-eight (78) seconds. The contact lens 502 of Example 1 does not fully reach the final resting position as it is still twenty-one (21) degrees away from the horizontal. Contact lenses 504 and 506 of Examples 2 and 3 reach the same position after twenty-four (24) blink cycles. However, the contact lens 506 of Example 3 presents a faster initial re-orientation leading to a faster overall re-orientation on the eye.

Table 2 below provides the contact lens position and movement during the last blink cycle. The change in location along the vertical axis is mainly explained by how each contact lens edge is interacting with the upper and lower eyelids. As most of these contact lenses differ in shape along the vertical axis significant differences are seen on the vertical position. Contact lenses of Example 1 and 2 show a temporal decentration while the contact lens 506 of Example 3 shows a nasal decentration. This shift in horizontal decentration is controlled from the maximum horizontal semi-diameter difference. It is preferred to have a shorter semi-diameter on the nasal side such that the contact lens wrapping tends to re-center the contact lens in that direction. The contact lens movement remains about the same across the three contact lenses 502, 504 and 506. However, the contact lens 506 of Example 3 shows better stability in rotation. The range in angular movement is about half of what is observed on the contact lenses 502 and 504 of Examples 1 and 2.

TABLE 2

Decentration and movement data obtained for lenses provided in Examples 1, 2 and 3.

| | Primary gaze after 24 blinks | | | | | | |
|---|---|---|---|---|---|---|---|
| | Total rotation | Decentration | | | Movement | | |
| | | X | Y | Decent. | H | V | Rot. |
| Example 1 | 21.57 | −0.18 | −0.08 | 0.20 | 0.26 | 0.56 | 0.80 |
| Example 2 | 6.70 | −0.25 | −0.13 | 0.29 | 0.26 | 0.55 | 0.55 |
| Example 3 | 6.86 | 0.11 | 0.30 | 0.32 | 0.27 | 0.60 | 0.20 |

In accordance with another aspect of the exemplary embodiment of the present invention, the proposed method gives great flexibilities to the skilled artisan for designing contact lenses. One may imagine controlling the axis of symmetry such that in one case the contact lens edge contour is symmetrical along the Y-axis or vertical axis such that the same design fits both left and right eyes. One may also imagine that the contact lens edge contour does not have any symmetry at all, such that the contact lens edge contour is fully customized to the geometry of the patient's eyelid geometry and eye shape.

One may also consider the case where the contact lens edge contour is particular enough such that it is obvious to the patient how the contact lens has to be handled on the finger or palm prior to insertion. For such designs the choice for the location of the second orientation for the lens-lid contact area difference calculation might not be the orientation of maximum strain energy but an orientation of the contact lens only twenty (20) or thirty (30) degrees away from its final position as the patient will preliminary orient the contact lens on this/her finger prior to insertion.

One may consider the case where one SKU of the full prescription range is chosen to optimize the contact lens edge contour and that the solution obtained is applied across the remaining SKUs. One may also consider the case where each individual SKU is optimized due to variation across the SKU range of thickness in the center and at the periphery of the contact lenses. Those variations in the thickness will affect the strain energy from the contact lens wrapping on the eye, thereby changing the contact lens centration on the eye. These variations in centration will change the locations of the intersection points between the contact lens edge contour and the eyelids contour thus affecting the lens-lid contact area difference for each SKU.

For someone skilled in the art of evaluating contact lens performance on eye, it is known that eyelid geometry changes with the gaze direction especially in the vertical direction. It is obvious then that such change in the eyelid geometry will affect the contact lens performance on the eye. Thus there is also an opportunity to improve the design performance by taking into account, during the design process, the eyelid geometry change due to gaze direction change. In addition, for someone skilled in the art of evaluating contact lens performance on the eye, it is known that eyelid geometry changes between ethnicities. Thus there is also an opportunity to design contact lens edge contours according to the population the contact lens design is intended for. The present invention may be used to generate contact lens designs for specific populations, including, Caucasian, Asian (Chinese, Japanese), African, or any other population with specific biometric eyelid and ocular surface data.

One may also imagine that commercially available contact lenses might not provide the best solution for patients having eye lid deformations caused from congenital abnormalities, trauma or any other causes affecting or inducing the eyelid to deform abnormally. Those deformations could affect the contact lens performance to a point where the patient might require custom contact lenses based on their eyelid geometries. The present invention may provide those patients with a solution that will allow them to wear contact lenses without impaction their performance.

Although shown and described is what is believed to be the most practical and preferred embodiments, it is apparent that departures from specific designs and methods described and shown will suggest themselves to those skilled in the art and may be used without departing from the spirit and scope of the invention. The present invention is not restricted to the particular constructions described and illustrated, but should be constructed to cohere with all modifications that may fall within the scope of the appended claims.

What is claimed is:

1. A method for forming non-round contact lenses for improving lens stability, rotation and centration on the eye, the method comprising:
    determining the geometry of an upper eyelid of at least one eye of a patient;
    determining the surface geometry of the ocular surface of at least one eye of the patient;
    setting an initial geometric shape of the outer contour of a non-round contact lens;
    calculating a first surface area overlap between the upper eyelid and a superior portion of the non-round contact lens when the non-round contact lens is at its optimal final position on the eye based upon the geometry of the ocular surface;
    calculating a second surface area overlap between the upper eyelid and a superior portion of the non-round contact lens when the non-round contact lens is at its least optimal position on the eye based upon the geometry of the ocular surface;
    maximizing the difference between the first and second surface area overlaps by changing the geometric shape of the outer contour of the non-round contact lens; and
    fabricating a non-round contact lens from the maximized difference.

2. The method for forming non-round contact lenses according to claim 1, further comprising:
    determining the geometry of a lower eyelid of at least one eye of a patient;
    calculating a first surface area overlap between the lower eyelid and an inferior portion of the non-round contact lens when the non-round contact lens is at its optimal final position on the eye based upon the geometry of the ocular surface;
    calculating a second surface area overlap between the lower eyelid and an inferior portion of the non-round contact lens when the non-round contact lens is at its least optimal position on the eye based upon the geometry of the ocular surface; and
    maximizing the difference between the first and second surface area overlaps by changing the geometric shape of the outer contour of the non-round contact lens.

3. The method for forming non-round contact lenses according to claim 1, wherein the outer contour is determined by an individual patient's eye and eyelid geometry.

4. The method for forming non-round contact lenses according to claim 1, wherein the outer contour is determined by an average geometry of a specific population subgroup eye and eyelid geometry.

5. The method for forming non-round contact lenses according to claim 1, wherein the outer contour is determined by an individual patient's eye and eyelid geometry for different gazes.

6. The method for forming non-round contact lenses according to claim 1, wherein the outer contour is planar.

7. The method for forming non-round contact lenses according to claim 1, wherein the outer contour is non-planar.

8. The method for forming non-round contact lenses according to claim 1, wherein the outer contour is symmetrical about a vertical axis of the non-round contact lens.

9. The method for forming non-round contact lenses according to claim 1, wherein the outer contour is non-symmetrical about a vertical axis of the non-round contact lens.

10. A method for forming non-round contact lenses for improving lens stability, rotation and centration on the eye, the method comprising:
    determining the geometry of a lower eyelid of at least one eye of a patient;
    determining the surface geometry of the ocular surface of at least one eye of the patient;
    setting an initial geometric shape of the outer contour of a non-round contact lens;
    calculating a first surface area overlap between the lower eyelid and an inferior superior portion of the non-round contact lens when the non-round contact lens is at its optimal final position on the eye based upon the geometry of the ocular surface;
    calculating a second surface area overlap between the lower eyelid and an inferior portion of the non-round contact lens when the non-round contact lens is at its least optimal position on the eye based upon the geometry of the ocular surface;
    maximizing the difference between the first and second surface area overlaps by changing the geometric shape of the outer contour of the non-round contact lens; and
    fabricating a non-round contact lens from the maximized difference.

11. The method for forming non-round contact lenses according to claim 10, further comprising:
    determining the geometry of an upper eyelid of at least one eye of a patient;
    calculating a first surface area overlap between the upper eyelid and a superior portion of the non-round contact lens when the non-round contact lens is at its optimal final position on the eye based upon the geometry of the ocular surface;
    calculating a second surface area overlap between the upper eyelid and a superior portion of the non-round contact lens when the non-round contact lens is at its least optimal position on the eye based upon the geometry of the ocular surface; and
    maximizing the difference between the first and second surface area overlaps by changing the geometric shape of the outer contour of the non-round contact lens.

12. The method for forming non-round contact lenses according to claim 10, wherein the outer contour is determined by an individual patient's eye and eyelid geometry.

13. The method for forming non-round contact lenses according to claim 10, wherein the outer contour is determined by an average geometry of a specific population subgroup eye and eyelid geometry.

14. The method for forming non-round contact lenses according to claim 10, wherein the outer contour is determined by an individual patient's eye and eyelid geometry for different gazes.

15. The method for forming non-round contact lenses according to claim 10, wherein the outer contour is planar.

16. The method for forming non-round contact lenses according to claim 10, wherein the outer contour is non-planar.

17. The method for forming non-round contact lenses according to claim 10, wherein the outer contour is symmetrical about a vertical axis of the non-round contact lens.

18. The method for forming non-round contact lenses according to claim 10, wherein the outer contour is non-symmetrical about a vertical axis of the non-round contact lens.

19. A method for forming non-round contact lenses for improving lens stability, rotation and centration on the eye, the method comprising:
   determining the geometry of an upper eyelid of at least one eye of a patient;
   determining the surface geometry of the ocular surface of at least one eye of the patient;
   setting an initial geometric shape of the outer contour of a non-round contact lens;
   calculating a first surface area overlap between the upper eyelid and a superior portion of the non-round contact lens when the non-round contact lens is at its optimal final position on the eye based upon the geometry of the ocular surface;
   calculating a second surface area overlap between the upper eyelid and a superior portion of the non-round contact lens when the non-round contact lens is at its least optimal position on the eye based upon the geometry of the ocular surface;
   maximizing the difference between the first and second surface area overlaps by changing the geometric shape of the outer contour of the non-round contact lens;
   determining the geometry of a lower eyelid of at least one eye of a patient;
   calculating a third surface area overlap between the lower eyelid and an inferior portion of the non-round contact lens when the non-round contact lens is at its optimal final position on the eye based upon the geometry of the ocular surface;
   calculating a fourth surface area overlap between the lower eyelid and an inferior portion of the non-round contact lens when the non-round contact lens is at its least optimal position on the eye based upon the geometry of the ocular surface;
   maximizing the difference between the third and fourth surface area overlaps by changing the geometric shape of the outer contour of the non-round contact lens; and
   fabricating a non-round contact lens from the maximized differences.

20. The method for forming non-round contact lenses according to claim 19, wherein the outer contour is determined by an individual patient's eye and eyelid geometry.

21. The method for forming non-round contact lenses according to claim 19, wherein the outer contour is determined by an average geometry of a specific population subgroup eye and eyelid geometry.

22. The method for forming non-round contact lenses according to claim 19, wherein the outer contour is determined by an individual patient's eye and eyelid geometry for different gazes.

23. The method for forming non-round contact lenses according to claim 19, wherein the outer contour is planar.

24. The method for forming non-round contact lenses according to claim 19, wherein the outer contour is non-planar.

25. The method for forming non-round contact lenses according to claim 19, wherein the outer contour is symmetrical about a vertical axis of the non-round contact lens.

26. The method for forming non-round contact lenses according to claim 19, wherein the outer contour is non-symmetrical about a vertical axis of the non-round contact lens.

* * * * *